(12) United States Patent
Saito et al.

(10) Patent No.: US 11,787,217 B2
(45) Date of Patent: Oct. 17, 2023

(54) OVER-LAMINATE FILM AND GRAPHIC LAMINATE

(71) Applicant: 3M INNOVATIVE PROPERTIES COMPANY, St. Paul, MN (US)

(72) Inventors: Koji Saito, Yamagata (JP); Naota Sugiyama, Kanagawa (JP); Shinsuke Kondo, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1 day.

(21) Appl. No.: 17/602,894

(22) PCT Filed: Apr. 14, 2020

(86) PCT No.: PCT/IB2020/053521
§ 371 (c)(1),
(2) Date: Oct. 11, 2021

(87) PCT Pub. No.: WO2020/212850
PCT Pub. Date: Oct. 22, 2020

(65) Prior Publication Data
US 2022/0195216 A1    Jun. 23, 2022

(30) Foreign Application Priority Data
Apr. 16, 2019  (JP) ................................ 2019-077843

(51) Int. Cl.
*B41M 7/00* (2006.01)

(52) U.S. Cl.
CPC ....... *B41M 7/0027* (2013.01); *B41M 2205/38* (2013.01); *B41M 2205/40* (2013.01)

(58) Field of Classification Search
CPC ............ B41M 7/0027; B41M 2205/38; B41M 2205/40
(Continued)

(56) References Cited

U.S. PATENT DOCUMENTS 5,760,122 A  *  6/1998  Susa .................... C09D 7/42
                                                524/492
6,096,469 A  *  8/2000  Anderson ................ B41M 5/52
                                                427/256
(Continued)

FOREIGN PATENT DOCUMENTS

| JP | H06-055900 | 3/1994 |
| JP | H07-052290 | 2/1995 |
| JP | H07-137221 | 5/1995 |
| JP | H09-309166 | 12/1997 |
| JP | 2000-318111 | 11/2000 |

(Continued)

OTHER PUBLICATIONS

Decorative Material JP-2001162758-A (Year: 2001).*
International Search Report for PCT International Application No. PCT/IB2020/053521, dated Jul. 21, 2020, 3 pages.

*Primary Examiner* — Betelhem Shewareged

(57) ABSTRACT

An over-laminate film applied to a decorative surface is described. In particular the over-laminate film includes: a transparent resin base film having a first surface and a second surface opposite to the first surface; a low gloss layer disposed on the first surface of the transparent resin base film; and a transparent adhesive layer disposed on the second surface of the transparent resin base film, the low gloss layer including a binder containing a resin, resin beads having an average particle size of 4 μm or greater and 20 μm or less, and nanosilica particles, the low gloss layer having surface glossiness of 5 GU or less at 60 degrees.

14 Claims, 1 Drawing Sheet

(58) Field of Classification Search
USPC .................................................. 428/32.13
See application file for complete search history.

(56) References Cited

U.S. PATENT DOCUMENTS

| | | | | |
|---|---|---|---|---|
| 6,632,487 | B1* | 10/2003 | Arai | .............. D21H 23/64 |
| | | | | 428/32.25 |
| 2008/0249221 | A1* | 10/2008 | Corkery | .............. C09J 11/04 |
| | | | | 524/404 |
| 2011/0171429 | A1 | 7/2011 | Huang | |
| 2013/0243979 | A1* | 9/2013 | Zeng | .............. B41M 5/506 |
| | | | | 428/32.37 |
| 2016/0236447 | A1 | 8/2016 | Akou | |
| 2019/0085506 | A1 | 3/2019 | Higashikawa | |
| 2020/0239729 | A1 | 7/2020 | Sugiyama | |
| 2022/0195216 | A1* | 6/2022 | Saito | .............. B32B 27/304 |

FOREIGN PATENT DOCUMENTS

| | | |
|---|---|---|
| JP | 3133531 | 2/2001 |
| JP | 3164619 | 5/2001 |
| JP | 3312437 | 8/2002 |
| JP | 3625337 | 3/2005 |
| JP | 2008-049494 | 3/2008 |
| JP | 2011-255552 | 12/2011 |
| JP | 5076588 | 11/2012 |
| JP | 2013142119 | 7/2013 |
| JP | 5690020 | 3/2015 |
| JP | 2015-227029 | 12/2015 |
| JP | 6198335 | 9/2017 |
| WO | WO 1997-046377 | 12/1997 |
| WO | WO 2008-129667 | 10/2008 |
| WO | WO 2013-046752 | 4/2013 |
| WO | WO 2019-077502 | 4/2019 |
| WO | WO 2020-212851 | 10/2020 |

* cited by examiner

OVER-LAMINATE FILM AND GRAPHIC LAMINATE

TECHNICAL FIELD

The present disclosure relates to an over-laminate film that can be used for the purposes such as decoration, and a graphic laminate.

BACKGROUND ART

Decorative films have been used for the purposes of decoration of the interior and exterior of buildings, vehicles, and the like. For example, decorative films in which a polyvinyl chloride film having a printed layer and a transparent polyvinyl chloride film are laminated and which have been subjected to embossing are known. Various material textures, such as woodgrain, metallic, textile, and marble textures, can be expressed by using various combinations of lamination and embossing.

For example, Patent Document 1 (JP 2011-255552 A) describes "an embossed decorative sheet having a surface that has been subjected to embossing, the embossed decorative sheet having a surface-protecting layer formed from a curable resin containing synthetic resin beads on a surface side of the decorative sheet, an average depth/height of the embossing being from 15 to 50 μm, and the synthetic resin beads being synthetic resin beads having an average particle size of 8 to 20 μm"

Patent Document 2 (WO 2008/129667) describes "a decorative sheet provided with a protective layer mainly composed of a transparent resin component provided on the surface of a printed layer of a printing sheet, wherein the protective layer comprises a first protective layer provided on the printed layer of the printing sheet and a second protective layer containing transparent or semi-transparent spherical particles and provided on given areas of the first protective layer, and the luster of the salient surface of the first protective layer is lower than the luster of the surface of the second protective layer".

SUMMARY OF INVENTION

Technical Problem

In recent years, there has been a demand for films that can reproduce surfaces of dry-finished wood, matte coating, and the like, have an appearance with lower glossiness, and can be used for the purpose of decoration. Methods by which a decorative film having a surface appearance with low glossiness is formed by coating with a resin containing microparticles or beads as a surface layer have been known. These decorative films can be used for exterior or interior of buildings, interior of vehicles, and decoration of furniture and articles, and the like.

It is known to protect a decorative surface by applying an over-laminate film to the decorative surface, such as a graphic film surface, or a wall surface to which a graphic film has been applied. It is desired to impart a low gloss appearance to such a decorative surface in an over-laminate manner.

The present disclosure provides an over-laminate film that can impart a low gloss appearance to a decorative surface, and a graphic laminate including such an over-laminate film.

Solution to Problem

According to an embodiment, provided is an over-laminate film applied to a decorative surface, the over-laminate film including: a transparent resin base film having a first surface and a second surface opposite to the first surface; a low gloss layer disposed on the first surface of the transparent resin base film; and a transparent adhesive layer disposed on the second surface of the transparent resin base film, the low gloss layer including a binder containing a resin, resin beads having an average particle size of 4 μm or greater and 20 μm or less, and nanosilica particles, and the low gloss layer having a surface glossiness of 5 GU or less at 60 degrees.

According to another embodiment, provided is a graphic laminate including: a resin base film having a first surface and a second surface opposite to the first surface; a graphic film including a printed layer disposed on the first surface and an adhesive layer disposed on the second surface; and the over-laminate film covering the printed layer of the graphic film.

Advantageous Effects of Invention

The over-laminate film of the present disclosure can impart a low gloss appearance to a decorative surface, and thus is suitable for use for interior and exterior of buildings, vehicles, or the like. The use of the over-laminate film of the present disclosure provides a design appearance that has a high contrast ratio and suppresses reflection of visible light on dark portions. In other words, the use of the over-laminate film of the present disclosure darkens the appearance of dark portions, and can thus provide a design appearance having a distinctive and sharper visual effect with a pronounced contrast.

Note that the above descriptions should not be construed to be a disclosure of all of the embodiments and benefits of the present disclosure.

DESCRIPTION OF EMBODIMENTS

Hereinafter, representative embodiments of the present invention will be described in more detail for the purpose of illustration, but the present invention is not limited to these embodiments.

In the present disclosure, "transparent" refers to a condition where the total light transmittance in the wavelength range of 400 to 700 nm of a material or article is approximately 85% or greater. "Translucent" refers to a condition where the total light transmittance in the wavelength range of 400 to 700 nm of a material or article is approximately 20% or greater and less than approximately 85%. "Opaque" refers to a condition where the total light transmittance in the wavelength range of 400 to 700 nm of a material or article is less than approximately 20%. The total light transmittance can be determined in accordance with JIS K 7361-1:1997 (ISO 13468-1:1996).

In an embodiment, an over-laminate film includes a transparent resin base film having a first surface and a second surface opposite to the first surface, a low gloss layer disposed on the first surface of the transparent resin base film, and a transparent adhesive layer disposed on the second surface of the transparent resin base film. The low gloss layer includes a binder containing a resin; resin beads having an average particle size of 4 µm or greater and 20 µm or less; and nanosilica particles, and has a surface glossiness of 5 GU at 60 degrees. When the low glass layer includes the resin beads having an average particle size within the range described above and nanosilica particles, a low gloss appearance is imparted to the over-laminate film.

In an embodiment, the over-laminate film is stretchable. The over-laminate film of this embodiment may be stretched so as to conform to the shape of the article to which the film is applied. The over-laminate film of some embodiments can maintain a low gloss appearance after stretching.

Figure 1:
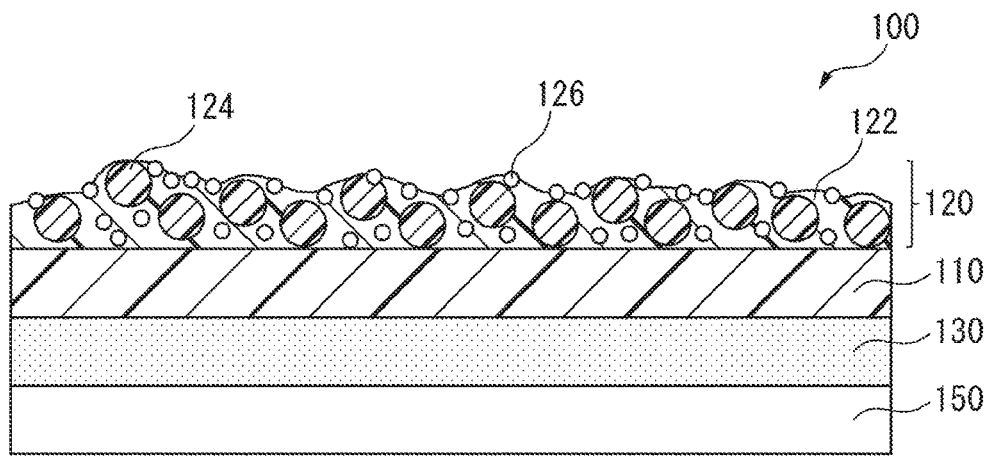
FIG. 1 is a schematic cross-sectional view of an over-laminate film according to an embodiment.

A schematic cross-sectional view of an over-laminate film of an embodiment is illustrated in FIG. 1. An over-laminate film 100 of FIG. 1 includes a transparent resin base film 110, a low gloss layer 120, and a transparent adhesive layer 130, and may include a liner 150 for protecting the transparent adhesive layer 130. The low gloss layer 120 include a binder 122 containing a resin, resin beads 124 having an average particle size of 4 µm or greater and 20 µm or less, and nanosilica particles 126.

Various resin films can be used as the transparent resin base film. The transparent resin base film may be stretchable. As the transparent resin base film, at least one type of resin film selected from the group consisting of polyvinyl chloride, polyurethane, polyethylene, polypropylene, vinyl chloride-vinyl acetate resins, acrylic resins, cellulose resins, and fluororesins can be used.

The transparent resin base film may be colored or colorless. The transparent resin base film may have a substantially smooth surface and may have a structured surface that can be formed by surface processing such as embossing. Configuring the appearance or the shape of the transparent resin base film as described above can impart various decorative characteristics to the over-laminate film.

In an embodiment, the total light transmittance of the transparent resin base film in the wavelength range of 400 to 700 nm is approximately 85% or greater, approximately 90% or greater, or appropriately 95% or greater.

The thickness of the transparent resin base film may be, for example, approximately 25 µm or greater, approximately 50 µm or greater, or approximately 80 µm or greater, and approximately 5 mm or less, approximately 1 mm or less, or approximately 0.5 mm or less.

In some embodiments, the tensile stretch ratio of the transparent resin base film is approximately 10% or greater, approximately 20% or greater, or approximately 30% or greater, and approximately 400% or less, approximately 350% or less, or approximately 300% or less. The tensile stretch ratio of the transparent resin base film is a value calculated by preparing a sample having a width of 25 mm and a length of 150 mm and stretching the sample until the sample is broken using a tensile tester at a temperature of 20° C., a tensile test speed of 300 mm/min, and an inter-chuck distance of 100 mm, using the equation: [inter-chuck distance at the time of breaking (mm)−inter-chuck distance before stretch (mm) (=100 mm)]/inter-chuck distance before stretch (mm) (=100 mm)×100(%).

The over-laminate film has a low gloss layer disposed on the first surface of the transparent resin base film. Various resins can be used as the resin included in the binder of the low gloss layer. In an embodiment, the binder contains a urethane resin. Various publicly known urethane resins can be used as the urethane resin. The urethane resin can be obtained by drying or curing a urethane resin composition. The urethane resin composition may be an aqueous or non-aqueous system. It is advantageous that the urethane resin is a cured product of a two-part urethane resin composition. The two-part urethane resin composition is typically a non-aqueous urethane resin composition. The use of the two-part urethane resin composition forms a chemical bond between the urethane resin with another component of the low gloss layer, e.g., resin beads, particularly urethane resin beads, and nanosilica particles during the formation of the low gloss layer, and can thus prevent or suppress separation of these particles from the low gloss layer and bleeding out of the components.

The two-part urethane resin composition typically contains a polyol as a main agent and a multi-functional isocyanate as a curing agent and, as necessary, a catalyst and/or a solvent.

As the polyol, polyester polyols, such as polycaprolactone diol and polycaprolactone triol; polycarbonate polyols, such as cyclohexanedimethanol carbonate and 1,6-hexanediol carbonate; and combinations of these can be used. These polyols can impart transparency, weather resistance, strength, chemical resistance, and the like to the low gloss layer. In particular, the polycarbonate polyol can form a low gloss layer having high transparency and chemical resistance. From the perspective of imparting stretchability to the low gloss layer without formation of excessive degree of crosslinked structure, the polyol is preferably a diol, and polyester diols and polycarbonate diols, especially polycarbonate diols, can be advantageously used.

The OH value of the polyol may be typically approximately 10 mg/KOH or greater, approximately 20 mg/KOH or greater, or approximately 30 mg/KOH or greater, and approximately 150 mg/KOH or less, approximately 130 mg/KOH or less, or approximately 120 mg/KOH or less.

Examples of the multi-functional isocyanate include aliphatic polyisocyanates, alicyclic polyisocyanates, aromatic polyisocyanates, and aromatic aliphatic polyisocyanates, and multimers (dimers, trimers, and the like), biuret-modified products, allophanate-modified products, polyol-modified products, oxadiazine trione-modified products, and carbodiimide-modified products of these polyisocyanates. From the perspective of imparting stretchability to the low gloss layer without formation of excessive degree of crosslinked structure, the multi-functional isocyanate is preferably diisocyanate. Examples of such diisocyanate include aliphatic diisocyanates, such as tetramethylene diisocyanate and hexamethylene diisocyanate (HDI); alicyclic diisocyanates, such as isophorone diisocyanate, trans,trans- and trans,cis- and cis,cis-dicyclohexylmethane-4,4'-diisocyanate and mixtures thereof (hydrogenated MDI); aromatic diisocyanates, such as 2,4-tolylene diisocyanate and 2,6-tolylene diisocyanate, and isomeric mixtures of these tolylene diisocyanate (TDI), 4,4'-diphenylmethane diisocyanate, 2,4'-diphenylmethane diisocyanate, 2,2'-diphenylmethane diisocyanate, and isomeric mixtures of these diphenylmethane diisocyanate (MDI); aromatic-aliphatic diisocyanates, such as 1,3- or 1,4-xylylene diisocyanate or mixtures thereof (XDI), and 1,3- or 1,4-tetramethylxylylene diisocyanate or mixtures thereof (TMXDI).

As the equivalent weight ratio of the polyol to the polyisocyanate, typically, the equivalent weight of the polyisocyanate may be approximately 0.6 equivalents or greater, approximately 0.7 equivalents or greater, and approximately 2 equivalents or less, or approximately 1.2 equivalents or less, per 1 equivalent of the polyol.

As the catalyst, catalysts that are typically used in formation of urethane resins, such as di-n-butyltin dilaurate, zinc naphthenate, zinc octenoate, and triethylenediamine, can be used. The content of the catalyst is typically approximately 0.005 parts by mass or greater, or approximately 0.01 parts by mass or greater, and approximately 0.5 parts by mass or less, or approximately 0.2 parts by mass or less, per 100 parts by mass of the two-part urethane resin composition.

The binder may further contain a cellulose ester. The inclusion of a cellulose ester in the binder can increase the viscosity of the binder during the drying process and decrease the surface fluidity, and thus allows uniform application of a binder precursor containing the resin beads. Examples of the cellulose ester include cellulose acetate propionate and cellulose acetate butyrate.

The number average molecular weight of the cellulose ester may be typically approximately 12000 or greater, approximately 16000 or greater, or approximately 20000 or greater, and approximately 110000 or less, approximately 100000 or less, or approximately 90000 or less, taking the solubility in the solvent into consideration. The number average molecular weight of the cellulose esters is determined by gel permeation chromatography (GPC) using standard polystyrene.

The glass transition temperature (Tg) of the cellulose ester may be typically approximately 85° C. or higher, approximately 96° C. or higher, or approximately 101° C. or higher, but approximately 190° C. or lower, approximately 180° C. or lower, or approximately 160° C. or lower, taking the capability of maintaining the shape at the used temperature into consideration. The glass transition temperature of the cellulose esters is determined using differential scanning calorimetry (DSC).

In some embodiments, approximately 5 parts by mass or greater, approximately 10 parts by mass or greater, or approximately 15 parts by mass or greater, and approximately 35 parts by mass or less, approximately 30 parts by mass or less, or approximately 25 parts by mass or less, per 100 parts by mass of the binder, of the cellulose ester may be included in the binder. When the compounded amount of the cellulose ester is within the range described above, the resin beads are uniformly dispersed in the low gloss layer, and thus a uniform low gloss appearance can be imparted to the over-laminate film.

The low gloss layer includes resin beads. Various resin beads can be used as the resin beads. The resin beads can form fine recesses and protrusions on the over-laminate film surface due to the presence of the beads, and thus can form a low gloss structure on the surface of the over-laminate film.

In an embodiment, the resin beads are urethane resin beads. Since the urethane resin beads have good affinity to the binder containing the resin, especially the binder containing the urethane resin, and thus exhibit high adhesion to the binder. As a result of this, separation of the urethane resin beads from the binder can be suppressed in the case where the over-laminate film is stretched or deformed. As the urethane resin beads, crosslinked polyurethane microparticles obtained via suspension polymerization, seed polymerization, emulsion polymerization, or the like can be used. The urethane resin beads have excellent flexibility, toughness, scratch resistance, and the like, and can impart these characteristics to the low gloss layer.

The average particle size of the resin beads is preferably approximately 4 μm or greater and approximately 20 μm or less. In some embodiments, the average particle size of the resin beads may be approximately 6 μm or greater, or approximately 10 μm or greater, and approximately 10 μm or less, or approximately 15 μm or less. The resin beads having an average particle size of less than approximately 4 μm tend to cause whitening of the surface of the over-laminate film due to light scattering. When the average particle size of the resin beads is greater than approximately 20 μm, glossiness tends to occur, and thus achievement of low glossiness is hindered. The urethane resin beads having the average particle size within the range described above can impart low lightness, i.e., low gloss with less whiteness, to the low gloss layer by appropriately scattering the incident light to the low gloss layer. The average particle size of the resin beads is the particle size having the cumulative volume of 50% measured using a laser diffraction particle size distribution measuring apparatus.

In some embodiments, the resin beads may be included in the low gloss layer in an amount of approximately 70 parts by mass or greater, approximately 80 parts by mass or greater, or approximately 100 parts by mass or greater, and approximately 240 parts by mass or less, approximately 230 parts by mass or less, or approximately 200 parts by mass or less, per 100 parts by mass of the binder. When the compounded amount of the resin beads is less than approximately 70 parts by mass, low glossiness is hard to be achieved, and when the compounded amount is approximately greater than 240 parts by mass, whitening tends to occur. When the compounded amount of the resin beads is within the range described above, a low gloss layer that exhibits low glossiness in a wide visual angle, for example, from 20 degrees to 85 degrees is obtained.

The low gloss layer of the present embodiment further includes nanosilica particles. The presence of the nanosilica particles in the binder can further decrease glossiness of the low gloss layer. The presence of the nanosilica particles suppresses change in low glossiness, which tends to be caused by stretching the film in the case where only the resin beads are used, and thus can effectively prevent whitening of the film.

As nanosilica particles, for example, a silica sol obtained using liquid glass (sodium silicate solution) as a starting material can be used. The surface of the nanosilica particles may be modified using a surface treatment agent, such as silane, alcohol, amine, carboxylic acid, sulfonic acid, phosphonic acid, and titanate.

In some embodiments, the average particle size of the nanosilica particles is approximately 10 nm or greater, approximately 20 nm or greater, or approximately 30 nm or greater, and approximately 100 nm or less, approximately 75 nm or less, or approximately 45 nm or less. As described above, the nanosilica particles having an extremely small size can be highly dispersed in the low gloss layer. Even when the over-laminate film is stretched, the fine nanosilica particles are dispersed and remained in the stretched part, and the loss of low glossiness can be suppressed to effectively prevent whitening of the over-laminate film. The nanosilica particles that are present adjacently to the resin beads may function as a sort of physical crosslinking points between the resin beads, especially urethane resin beads, and the binder. The presence of the nanosilica particles that may function as such physical crosslinking points suppresses separation of the resin beads during stretching of the over-laminate film, and can effectively prevent whitening of the over-laminate film. The average particle size of the nanosilica particles is a value converted from the specific surface area according to the BET method.

In some embodiments, the nanosilica particles may be included in the low gloss layer in an amount of approximately 5 parts by mass or greater, approximately 10 parts by mass or greater, or approximately 20 parts by mass or greater, and approximately 120 parts by mass or less, approximately 110 parts by mass or less, or approximately 100 parts by mass or less, per 100 parts by mass of the binder. When the compounded amount of the nanosilica particles is within the range described above, the low gloss appearance is maintained even during stretching of the over-laminate film, and prevents or suppresses the increase in lightness, i.e. whitening during, for example, 150% stretching. Furthermore, when the compounded amount of the nanosilica particles is within the range described above, excellent scratch resistance can be imparted to the low gloss layer.

The low gloss layer may further include a silicone-modified polymer having a functional group capable of reacting with an isocyanate or hydroxy group. When finger sebum is attached on the surface with low gloss, the trace thereof is easily observed. The inclusion of the silicone-modified polymer having a functional group capable of reacting with an isocyanate or hydroxy group in the low gloss layer can enhance fingerprint resistance of the low gloss layer. The silicone-modified polymer decreases the friction coefficient of the low gloss layer, and thus can impart scratch resistance based on smoothness to the low gloss layer. The isocyanate or hydroxy group of the silicone-modified polymer may be reacted with the hydroxy group or isocyanate group of the urethane resin or urethane resin beads in the binder, and the silicone-modified polymer may be bonded to the urethane resin or the urethane resin beads. In this embodiment, bleeding out of the silicone-modified polymer from the low gloss layer can be prevented or suppressed.

As the silicone-modified polymer having a functional group capable of reacting with an isocyanate or hydroxy group, silicone-modified polymer, such as a polyether-modified silicone, polyester-modified silicone, aralkyl-modified silicone, acryl-modified silicone, and silicone-modified polyacrylate and urethane-modified silicone, can be used. Examples of the functional group capable of reacting with an isocyanate or hydroxy group of the silicone-modified polymer include a hydroxyl group, an amino group having active hydrogen, an isocyanate group, an epoxy group, and an acid anhydride group. From the perspective of achieving especially excellent fingerprint resistance, the silicone-modified polymer is advantageously a silicone-modified polyacrylate. The silicone-modified polymer preferably has a hydroxy group or an isocyanate group having high reactivity with an isocyanate or hydroxy group, and particularly preferably has a hydroxy group.

In some embodiments, the silicone-modified polymer having a functional group that can react with an isocyanate or hydroxy group, e.g., a silicone-modified polyacrylate, may be included in the low gloss layer in an amount of approximately 0.1 parts by mass or greater, approximately 0.5 parts by mass or greater, or approximately 1.0 part by mass or greater, and approximately 15 parts by mass or less, approximately 12 parts by mass or less, or approximately 10 parts by mass or less, per 100 parts by mass of the binder. When the compounded amount of the silicone-modified polymer is within the range described above, fingerprint resistance and/or scratch resistance of the low gloss layer can be further enhanced.

As (an)other optional component(s), the low gloss layer may include additive(s) such as fillers other than the resin beads and nanosilica particles, UV absorbers, photostabilizers, thermal stabilizers, dispersants, plasticizers, flow enhancing agents, and leveling agents. Each and the total compounded amounts of these additives can be decided in the range where the characteristics required of the low gloss layer are not impaired.

In an embodiment, the low gloss layer includes a flake-shaped filler having an average particle size of greater than approximately 30 µm and less than approximately 1000 µm in in a range where the low gloss appearance is not impaired. Examples of the flake-shaped fillers include expandable graphite, aluminum foil powder pigments, glass flake powder pigments, and resin film foil powder pigments. The average particle size of the flake-shaped filler is the particle size having a cumulative volume of 50% measured using a laser diffraction particle size distribution measuring apparatus. The thickness of the flake-shaped filler may be 0.5 µm to 30 µm. The aspect ratio of the flake-shaped filler may be 1.0 to 2000.

The low gloss layer can be formed by using a surface coating composition including a binder precursor containing a resin composition, resin beads having an average particle size of 4 lam or greater and 20 µm or less, and nanosilica particles. In an embodiment, the resin composition is a urethane resin composition. In an embodiment, the resin beads are urethane resin beads.

The binder precursor may contain the cellulose ester described above for the binder, in addition to the resin composition. The cellulose ester can impart quick-drying properties, dry feeling when touched by a finger, flowability, leveling properties, or the like to the surface coating composition. The cellulose ester can be used for adjusting the viscosity of the surface coating composition.

The surface coating composition may further contain a silicone-modified polymer having a functional group capable of reacting with the isocyanate or hydroxy group described above. The isocyanate or hydroxy group of the silicone-modified polymer can be reacted with the hydroxy group or isocyanate group of the urethane resin composition or urethane resin beads to bond the silicone-modified polymer with the urethane resin or the urethane resin beads. This can prevent or suppress bleeding out of the silicone-modified polymer from the low gloss layer. When the silicone-modified polymer is used, from the perspective of reactivity, it is advantageous that the urethane resin composition be a two-part urethane resin composition.

The formula of the surface coating composition is as described for the low gloss layer. The same applies to compounded amounts of the cellulose ester, resin beads, nanosilica particles, and silicone-modified polymer having a functional group that can react with an isocyanate or hydroxy group except for changing "100 parts by mass of the binder" as a reference to "100 parts by mass of the binder precursor".

To enhance workability, coatability, and the like, the surface coating composition may further contain a solvent, such as ketones, such as methyl ethyl ketone, methyl isobutyl ketone, and acetyl acetone; aromatic hydrocarbons, such as toluenes, and xylenes; alcohols, such as ethanol and isopropyl alcohol; esters, such as ethyl acetate and butyl acetate; and ethers, such as tetrahydrofuran, propylene glycol monomethyl ether, propylene glycol monomethyl ether acetate (1-methoxy-2-propyl acetate), and dipropylene glycol monomethyl ether acetate. The compounded amount of the solvent in the surface coating composition is typically approximately 20 parts by mass or greater, or approximately 30 parts by mass or greater, and approximately 60 parts by mass or less, or approximately 50 parts by mass or less, per 100 parts by mass of the binder precursor.

The viscosity of the surface coating composition is typically approximately 20 mPa·s or greater, approximately 50 mPa·s or greater, or approximately 100 mPa·s or greater, and approximately 1000 mPa·s or less, approximately 800 mPa·s or less, or approximately 600 mPa·s or less. The viscosity of the surface coating composition is measured using a B-type viscometer at a rotational speed of 60 rpm by selecting an appropriate spindle.

The low gloss layer can be formed by coating the substrate with the surface coating composition using knife coating, bar coating, blade coating, doctor coating, roll coating, cast coating, and the like and, as necessary, heating at approximately 80° C. to 150° C., and drying and/or curing.

The thickness of the low gloss layer may be, for example, approximately 3 μm or greater, approximately 5 μm or greater, or approximately 10 μm or greater, and approximately 50 μm or less, approximately 30 μm or less, or approximately 20 μm or less. In the present disclosure, the thickness of the low gloss layer refers to the thickness of the thickest portion, i.e. the maximum thickness.

In some embodiments, the low gloss layer is transparent or translucent. In these embodiments, the total light transmittance in the wavelength range of 400 to 700 nm of the low gloss layer may be approximately 80% or greater, approximately 85% or greater, or approximately 90% or greater.

The over-laminate film has a transparent adhesive layer disposed on the second surface of the transparent resin base film. Generally used adhesives such as solvent-type, emulsion-type, pressure-sensitive type, heat-sensitive type, and heat-curable or ultraviolet-curable type adhesives, including acrylics, polyolefins, polyurethanes, polyesters, rubbers, and the like can be used as the transparent adhesive layer. The thickness of the transparent adhesive layer may be typically approximately 5 μm or greater, approximately 10 μm or greater, or approximately 20 μm or greater, and approximately 100 μm or less, approximately 80 μm or less, or approximately 50 μm or less.

In an embodiment, the total light transmittance of the transparent adhesive layer in the wavelength range of 400 to 700 nm is approximately 85% or greater, approximately 90% or greater, or approximately 95% or greater.

The surface of the transparent adhesive layer may be provided with a liner. Examples of the liner include papers; plastic materials, such as polyethylene, polypropylene, polyester, and cellulose acetate; and papers coated with such plastic materials. These liners may have a surface that has been subjected to release treatment with silicone or the like. The thickness of the liner is typically approximately 5 μm or greater, approximately 15 μm or greater, or approximately 25 μm or greater, and approximately 500 μm or less, approximately 300 μm or less, or approximately 250 μm or less.

In an embodiment, the surface glossiness of the low gloss layer is approximately 5 GU or less when the measurement angle is set to 60 degrees. In some embodiments, the surface glossiness of the low gloss layer is approximately 0.7 GU or less, approximately 0.5 GU or less, or approximately 0.3 GU or less at 60 degrees.

In an embodiment, the surface glossiness of the low gloss layer is approximately 0.2 GU or less at 20 degrees, approximately 0.7 GU or less at 60 degrees, and approximately 5.0 GU or less at 85 degrees. In some embodiments, the surface glossiness of the low gloss layer is approximately 0.2 GU or less at 20 degrees, approximately 0.5 GU or less at 60 degrees, approximately 4.5 GU or less at 85 degrees, or approximately 0.1 GU or less at 20 degrees, approximately 0.3 GU or less at 60 degrees, and approximately 4.0 GU or less at 85 degrees. When the surface glossiness of the low gloss layer is a combination of the ranges described above, the reflection of incident light from various angles on the over-laminate film can be suppressed, and the decorative surface covered with the over-laminate film can be recognized from a wide range of viewing angles.

In an embodiment, the total light transmittance of the over-laminate film in the wavelength range of 400 to 700 nm is approximately 75% or greater, approximately 80% or greater, or approximately 85% or greater.

In another embodiment, the over-laminate film further includes a printed pattern that partially covers the low gloss layer. The surface with a low gloss appearance has light diffusing or irregular light reflection properties, and thus is not suitable for expressing an uneven texture. Even when the low gloss surface is subjected to, for example, embossing, the glossiness of the entire surface is so low that recognition of the contrast of the texture formed by the embossing is difficult, which results in the decrease of visibility of the texture. This is more pronounced as the glossiness of the low gloss surface decreases. By using a printed pattern that partially covers the low gloss layer, a change in glossiness caused by cooperation between the uncovered regions of the low gloss layer and the printed pattern is perceived by the viewer as a texture (unevenness). In this way, a texture that can be seen even on a low gloss surface can be formed on the over-laminate film.

Figure 2:
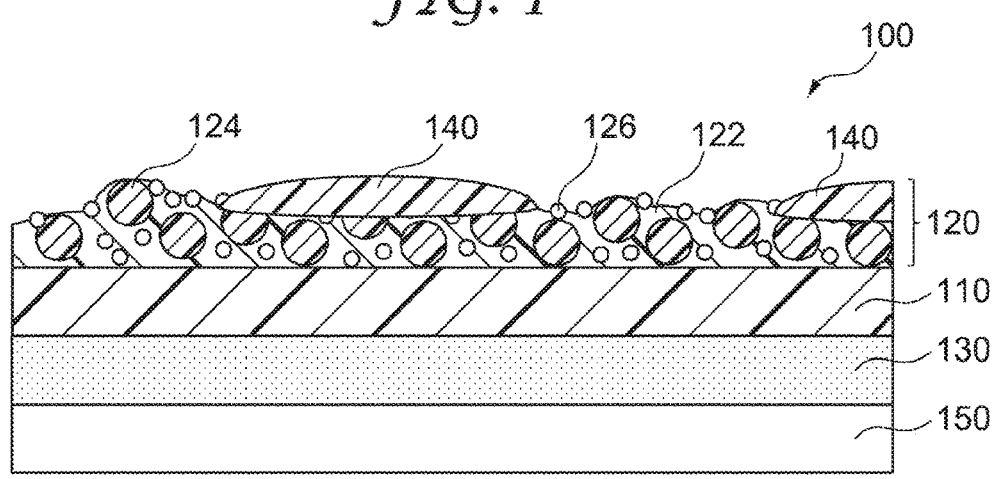
FIG. 2 is a schematic cross-sectional view of an over-laminate film according to another embodiment.

A schematic cross-sectional view of the over-laminate film of this embodiment is illustrated in FIG. 2. The over-laminate film 100 of FIG. 2 includes a printed pattern 140 that partially covers the low gloss layer 120.

The printed pattern is used to provide a glossy area over the low gloss layer to impart a texture, which is visible due to the difference in glossiness with the low gloss layer, to the film. The printed pattern may be formed using a printing technique such as inkjet printing, gravure printing, electrostatic printing, screen printing, or offset printing.

Solvent-based inks, water-based inks, or UV curable inks can be used as the printing ink. The printing ink may be transparent, translucent, or opaque and may be colorless or colored.

The thickness of the printed pattern may vary, and, when a solvent-based ink is used, the thickness may be typically approximately 1 μm or greater or approximately 2 μm or greater, and approximately 10 μm or less or approximately 5 μm or less. When a UV curable ink is used, the thickness of the printed pattern may be approximately 1 μm or greater or approximately 5 μm or greater, and approximately 50 μm or less or approximately 30 μm or less. In the present disclosure, the thickness of the printed pattern refers to the thickness of the thickest portion, i.e. the maximum thickness.

The printed pattern may be continuous or discontinuous. The printed pattern may be arranged to correspond to the entire surface of the film or may be arranged to correspond to a portion or a plurality of portions of the surface. Examples of the printed pattern include woodgrain, stone, logo, picture, text, and symbols.

In an embodiment, the printed pattern is an inkjet printed pattern. Inkjet printing allows on-demand manufacturing in a short delivery period.

In an embodiment, the printing ink is a UV curable ink and is advantageously printed by ink jet printing. The UV curable ink can form a printed pattern having a smooth surface with a large difference in height, and thus can increase the difference in surface glossiness between the region of the printed pattern and the region not covered with the printed pattern on the low gloss layer, thereby making the texture more clearly visible.

As a UV curable ink, either of radical polymerization type or cationic polymerization type may be used. As the UV curable ink, solventless inks including polymerizable monomers and/or polymerizable oligomers, photopolymerization initiators, and other optional components (photostabilizers, polymerization inhibitors, UV absorbers, defoamers, antifouling agents, and the like) can be advantageously used. It is also possible to use a water-based ink or a solvent-based ink as the UV curable ink.

In an embodiment, the UV curable ink is a radically polymerized acrylic ink. The printed pattern formed using the acrylic ink has marked transparency, strength, weather resistance, and the like, and is advantageous when the over-laminate film is used as, for example, as an interior material.

The viscosity of the UV curable ink may be approximately 5 mPa·s or greater or approximately 15 mPa·s or greater, and approximately 60 mPa·s or less or approximately 50 mPa·s or less at 25° C., and, during ink injection, may be approximately 1 mPa·s or greater or approximately 5 mPa·s or greater, and may be 20 mPa·s or less or approximately 15 mPa·s or less at, for example, 45° C. When the viscosity of the UV curable ink is within the range described above, the shape of the ink droplets is maintained at the time of landing of the ink droplets while ensuring ink fluidity during injection of ink droplets, whereby a printed pattern with a high height difference can be formed.

A printed pattern can be formed by inkjet-printing a UV curable ink on the low gloss layer, and curing the ink by irradiation with ultraviolet light. The UV curable ink is printed so as to cover at least a portion of the low gloss layer. The thickness of the printed pattern may be increased by repeatedly printing the UV curable ink.

The thickness of the over-laminate film may be typically approximately 20 μm or greater, approximately 50 μm or greater, or approximately 80 μm or greater, and approximately 500 μm or less, approximately 250 μm or less, or approximately 150 μm or less. The thickness of the over-laminate film refers to the maximum thickness in the film surface, and does not include the thickness of the liner.

The graphic laminate of an embodiment includes a resin base film having a first surface and a second surface opposite to the first surface, a printed layer disposed on the first surface, and an adhesive layer disposed on the second surface, and the over-laminate film of the present disclosure covering the printed layer of the graphic film. Covering the printed layer of the graphic film with the over-laminate film of the present disclosure can impart a low gloss appearance to the decorative surface expressed by the printed layer of the graphic film. Unexpectedly and without being bound by any theory, the over-laminate film of the present disclosure can be used to provide a high contrast ratio design appearance in which visible light reflection of dark portions is suppressed. In other words, the use of the over-laminate film of the present disclosure darkens the appearance of dark portions, and can thus provide a design appearance having a distinctive and sharper visual effect with a pronounced contrast.

Figure 3:
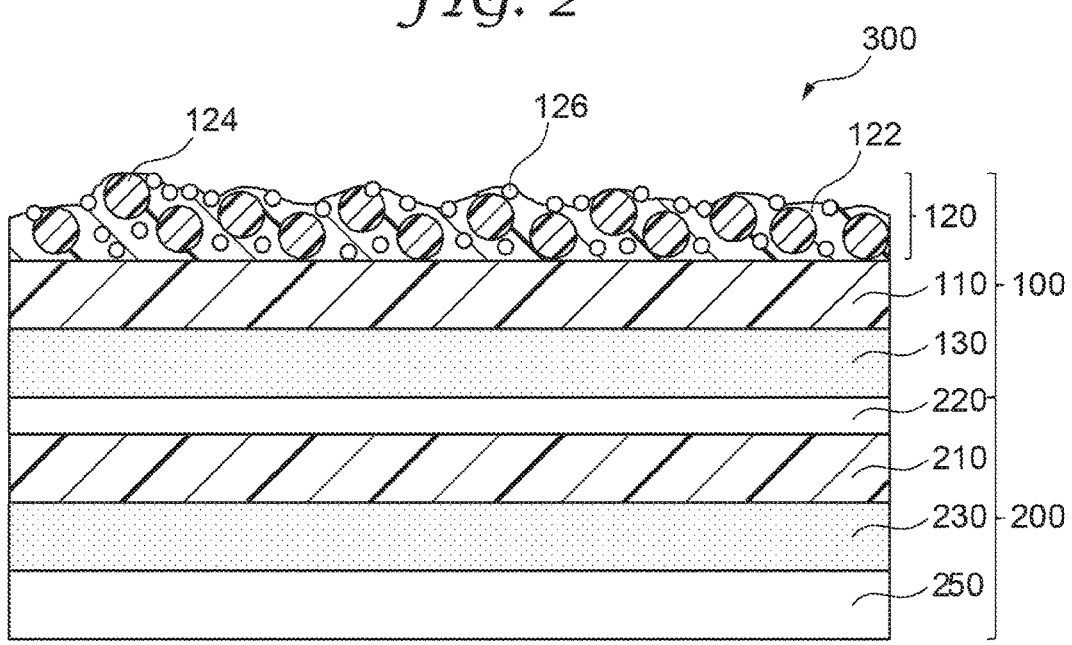
FIG. 3 is a schematic cross-sectional view of a graphic laminate according to an embodiment.

A schematic cross-sectional view of the graphic laminate of an embodiment is illustrated in FIG. 3. A graphic laminate 300 of FIG. 3 includes a resin base film 210, a printed layer 220, a graphic film 200 including an adhesive layer 230, and an over-laminate film 100 covering the printed layer 220 of the graphic film 200. The over-laminate film 100 is laminated on the printed layer 220 of the graphic film via the transparent adhesive layer 130.

Various resin films can be used as the resin base film of the graphic film. The resin base film may be stretchable. As the resin base film, at least one type of resin film selected from the group consisting of polyvinyl chloride, polyurethane, polyethylene, polypropylene, vinyl chloride-vinyl acetate resins, acrylic resins, cellulose resins, and fluororesins can be used.

The resin base film may be colored or colorless. The resin base film may be opaque, translucent, or transparent. The resin base film may have a substantially smooth surface and may have a structured surface that can be formed by surface processing, such as embossing. Configuring the appearance or the shape of the resin base film as described above can impart various decorative characteristics to the graphic laminate.

In an embodiment, the resin base film includes a transparent polyvinyl chloride resin layer and a colored polyvinyl chloride resin layer. In the graphic laminate of this embodiment, the colored polyvinyl chloride resin layer is supported or protected by the transparent polyvinyl chloride resin layer, and thus durability can be imparted to the graphic laminate. For example, the graphic laminate of this embodiment can be suitably used for adhesion to interior materials or exterior materials of buildings or vehicles.

The thickness of the resin base film may be, for example, approximately 25 μm or greater, approximately 50 μm or greater, or approximately 80 μm or greater, and approximately 5 mm or less, approximately 1 mm or less, or approximately 0.5 mm or less.

In some embodiments, the tensile stretch ratio of the resin base film is approximately 10% or greater, approximately 20% or greater, or approximately 30% or greater, and approximately 400% or less, approximately 350% or less, or approximately 300% or less. The tensile stretch ratio of the resin base film is a value calculated by preparing a sample having a width of 25 mm and a length of 150 mm and stretching the sample until the sample is broken using a tensile tester at a temperature of 20° C., a tensile test speed of 300 mm/min, and an inter-chuck distance of 100 mm, using the equation: [inter-chuck distance at the time of breaking (mm)−inter-chuck distance before the stretching (mm) (=100 mm)]/inter-chuck distance before the stretching (mm) (=100 mm)×100(%).

The printed layer disposed on the first surface of the resin base film imparts designability to the graphic film. The printed layer may be formed on the first surface of the resin base film using a printing technique such as inkjet printing, gravure printing, electrostatic printing, screen printing, or offset printing.

As the printing ink, solvent-based inks, water-based inks, or UV curable inks can be used. The printing ink may be transparent, translucent, or opaque, and may be colorless or colored.

The thicknesses of the printed layer may vary, and when a solvent-based ink is used, the thickness may be typically approximately 1 μm or greater or approximately 2 μm or greater, and approximately 10 μm or less or approximately 5 μm or less. When a UV curable ink is used, the thickness may be approximately 1 μm or greater or approximately 5 μm or greater, and approximately 50 μm or less or approximately 30 μm or less. In the present disclosure, the thickness of the printed layer refers to the thickness of the thickest portion, i.e. the maximum thickness.

The printed layer may be continuous or discontinuous. The printed layer may be arranged to correspond to the entire surface of the resin base film or may be arranged to correspond to a portion or a plurality of portions of the surface. The printed layer may cover the entire surface of the resin base film. In an embodiment, the printed layer includes a printed region and an unprinted region. Examples of the design of the printed layer include woodgrain, stone, logo, picture, text, and symbols.

In an embodiment, the printed layer is an inkjet printed layer. Inkjet printing allows on-demand manufacturing in a short delivery period.

As the adhesive layer disposed on the second surface of the resin base film, generally used adhesives such as solvent-type, emulsion-type, pressure-sensitive type, heat-sensitive type, and heat-curable or ultraviolet-curable type adhesives, including acrylics, polyolefins, polyurethanes, polyesters, rubbers, and the like can be used. The thickness of the adhesive layer may be typically approximately 5 μm or greater, approximately 10 μm or greater, or approximately 20 μm or greater, and approximately 100 μm or less, approximately 80 μm or less, or approximately 50 μm or less.

The adhesive layer may be colored or colorless. The adhesive layer may be opaque, translucent, or transparent. In an embodiment, the adhesive layer is a white adhesive layer including a pigment such as titanium oxide. The white adhesive layer can enhance the sharpness of the design expressed by the printed layer and, as necessary, the resin base film.

The surface of the adhesive layer may be provided with a liner. Examples of the liner include papers; plastic materials, such as polyethylene, polypropylene, polyester, and cellulose acetate; and papers coated with such plastic materials. These liners may have a surface that has been subjected to release treatment with silicone or the like. The thickness of the liner is typically approximately 5 μm or greater, approximately 15 μm or greater, or approximately 25 μm or greater, and approximately 500 μm or less, approximately 300 μm or less, or approximately 250 μm or less.

The use of the over-laminate film and the graphic laminate of the present disclosure is not particularly limited. For example, the over-laminate film and the graphic laminate of the present disclosure can be used as interior materials of, for example, walls, stairs, ceilings, pillars, and partitions, or exterior materials of, for example, outer walls of constructions such as buildings, apartments, or houses. Furthermore, they can be also used as interior or exterior materials of various transportation vehicles such as railway vehicles, vessels, aircrafts, automobiles including two-wheeled vehicles, and four-wheeled vehicles. Furthermore, the over-laminate film can be also used as covering materials for various articles, such as traffic signs, signboards, furniture, and electrical appliances.

EXAMPLES

In the following examples, specific embodiments of the present disclosure will be exemplified, but the present invention is not limited thereto. All "parts" and "percent" are based on mass unless otherwise specified. The numerical values essentially include errors derived from the measurement principles and measuring devices. The numerical values are generally indicated by significant figures that have been rounded.

Materials and reagents used in the present examples are shown in Table 1.

TABLE 1

| Name or abbreviation | Description | Supplier |
|---|---|---|
| Art pearl CE-800T | Urethane resin beads, average particle size: 6 μm | Negami Chemical Industrial Co., Ltd. (Nomi-shi, Ishikawa, Japan) |
| MIBK ST L | Nanosilica particles, average particle size: 40 to 50 nm, 30 mass % methyl isobutyl ketone (MIBK) dispersion liquid | Nissan Chemical Industries, Ltd. (Chiyoda-ku, Tokyo, Japan) |
| T5652 | Polycarbonate diol, OH value: 51 to 61 mg KOH/g, viscosity: 7000 to 16000 mPa · s (50° C.) | Asahi Kasei Corporation (Chiyoda-ku, Tokyo, Japan) |
| CAB-381-20 | Cellulose acetate butyrate | Eastman Chemical Company (Kingsport, Tennessee, US) |
| SILCLEAN 3700 | Hydroxy group-containing silicone-modified polymer | BYK Japan KK (Shinjuku-ku, Tokyo, Japan) |
| D110N | Xylylene diisocyanate | Mitsui Chemicals, Inc. (Minato-ku, Tokyo, Japan) |
| 1-Methoxy-2-propyl acetate | Solvent | Sigma-Aldrich Co. LLC (St. Louis, Missouri, US) |
| Transparent resin substrate 1 | 0.08 mm-thick transparent polyvinyl chloride film, polyvinyl chloride/ester plasticizer/organic stabilizer (acrylic resin, zinc stearate, and the like) = 72/16/12 (mass ratio). | 3M Japan Limited (Shinagawa-ku, Tokyo, Japan) |
| Adhesive 1 (ADH1) | Acrylic adhesive, isooctyl acrylate (IOA)-methyl acrylate (MA)-acrylic acid (AA) = 70: 22.5:7.5 (mass ratio) | 3M Company (Saint Paul, Minnesota, US) |
| Crosslinking agent 1 (CL1) | Crosslinking agent, 1,1'-isophthaloyl-bis (2-methyl aziridine) | 3M Company (Saint Paul, Minnesota, US) |
| IJ180CV3-10XR | Graphic film, white polyvinyl chloride film, 0.09 mm in thickness (including adhesive layer) | 3M Japan Limited (Shinagawa-ku, Tokyo, Japan) |
| IJ5331CV3 | Graphic film, white polyvinyl chloride film, 0.09 mm in thickness (including adhesive layer) | 3M Japan Limited (Shinagawa-ku, Tokyo, Japan) |
| SC501 | Graphic film, black polyvinyl chloride film, 0.08 mm in thickness (including adhesive layer) | 3M Japan Limited (Shinagawa-ku, Tokyo, Japan) |
| IJ4117N | Over-laminate film, transparent matte type polyvinyl chloride film, 0.08 mm thickness (including adhesive layer) | 3M Japan Limited (Shinagawa-ku, Tokyo, Japan) |
| IJ4137 | Over-laminate film, transparent matte type polyvinyl chloride film, 0.10 mm in thickness (including adhesive layer) | 3M Japan Limited (Shinagawa-ku, Tokyo, Japan) |

Making of Over-Laminate Film

Example 1

A low gloss layer coating composition was obtained by agitating a mixture having the composition shown in Table 2 for 3.5 minutes using a Planetary Centrifugal Mixer THINKY AR-250 (Thinky Corporation, Chiyoda-ku, Tokyo, Japan). The transparent resin substrate 1 was coated with the low gloss layer coating composition by using a knife coater so that the gap was 40 μm. The substrate 1 was placed in an oven at a temperature of 65° C. for 1.5 minutes to remove the solvent from the coating layer, and then placed in an oven at a temperature of 120° C. for 5 minutes to heat-cure the coating layer, thereby forming a low gloss layer having a dry thickness of approximately 12 μm. An over-laminate film 1 was made by laminating a transparent adhesive layer on the side opposite to the low gloss layer of the film thus obtained. The transparent adhesive layer was formed with a dry thickness of approximately 30 μm by mixing 100 parts by mass of ADH1 and 0.2 parts by mass of CL1, applying the mixture onto silicone coated polyethylene laminate paper, and drying it at 65° C. for 2 minutes, and then at 90° C. for 3 minutes.

Comparative Example 1

A low gloss layer coating composition was prepared in the same manner as in Example 1 except for using no nanosilica particles and changing the compounded amount to the amount shown in Table 2, and an over-laminate film Cl was made.

TABLE 2

|  | Example 1 (Over-laminate film 1) | Comparative Example 1 (Over-laminate film C1) |
|---|---|---|
| Art pearl CE-800T | 15.0 | 15.0 |
| MIBK ST L | 15.0 | — |
| T5652 | 8.4 | 12.0 |
| CAB-381-20 | 2.1 | 3.0 |
| SILCLEAN 3700 | 1.2 | 1.2 |
| D110N | 2.52 | 3.60 |
| 1-Methoxy-2-propyl acetate | 59.5 | 70.0 |

Characteristics of Over-Laminate Film

The over-laminate film 1 of Example 1, the over-laminate film Cl of Comparative Example 1, the over-laminate film (IJ4117N) of Comparative Example 2, and the over-laminate film (IJ4137) of Comparative Example 3 were measured for the surface glossiness, surface measured color (lightness L*), and surface glossiness and lightness L* after 150% stretch under the following conditions. The results are shown in Table 3-1 and Table 3-2.

Surface Glossiness

The over-laminate film was laminated on SC501, and the surface glossiness was measured at the measurement angles of 20 degrees/60 degrees/85 degrees using a portable glossmeter BYK-Gardner micro-TRI-gloss (BYK Japan KK, Shinjuku-ku, Tokyo, Japan). When the surface glossiness at 60 degrees was 5 GU or less, the sample was evaluated as satisfying practical low glossiness requirements. Furthermore, when the surface glossiness of 0.2 GU or less at the measurement angle of 20 degrees, 0.7 GU or less at 60 degrees, and 5.0 GU or less at 85 degrees was satisfied, the sample was evaluated as exhibiting significantly excellent low gloss surface appearance.

Surface Glossiness after 150% Stretch

The over-laminate film was laminated on SC501, and the laminate thus obtained was cut into 150 mm×15 mm to prepare a sample. The sample was subjected to 150% stretching using a Tensilon Universal Material Testing Instrument RTC-1210A (A&D Company, Limited, Toshima-ku, Tokyo, Japan) at a rate of 100 mm/min in an environment at a temperature of 20° C. and a relative humidity of 60%. The surface glossiness of the sample after stretching was measured at a measurement angle of 20 degrees/60 degrees/85 degrees. When the surface glossiness at 60 degrees was 5 GU or less, the sample was evaluated as satisfying practical low glossiness requirements. Furthermore, when the surface glossiness of 0.2 GU or less at the measurement angle of 20 degrees, 0.7 GU or less at 60 degrees, and 5.0 GU or less at 85 degrees was satisfied, the sample was evaluated as exhibiting significantly excellent low gloss surface appearance.

Surface Color Measurement (Lightness L*)

The over-laminate film was laminated on SC501, and the lightness L* values were measured using a spectrophotometer CM-3700d (Konica Minolta Japan, Inc., Minato-ku, Tokyo, Japan) with a light source D65/10°, specular reflection treatment SCI, and UV reflection 0%.

Lightness L* after 150% Stretching

The over-laminate film was laminated on SC501, and the laminate thus obtained was cut into 150 mm×15 mm to prepare a sample. The sample was subjected to 150% stretching using a Tensilon Universal Material Testing Instrument RTC-1210A (A&D Company, Limited, Toshima-ku, Tokyo, Japan) at a rate of 100 mm/min in an environment at a temperature of 20° C. and a relative humidity of 60%. Surface colors of the samples after stretching were measured. The difference of lightness ΔL* was calculated, when the lightness of the over-laminate film before stretching is $L^*_1$, the lightness after 150% stretching is $L^*_2$, and the difference of lightness $\Delta L^* = L^*_2 - L^*_1$. The lower the difference in lightness ΔL*, the less the increase in lightness, i.e. whitening due to stretching.

TABLE 3-1

| Over-laminate film | Surface glossiness (GU) before stretching | | | Surface glossiness after 150% stretching | | |
|---|---|---|---|---|---|---|
|  | 20 Degree | 60 Degree | 85 Degree | 20 Degree | 60 Degree | 85 Degree |
| Example 1 | 0.0 | 0.4 | 3.3 | 0.1 | 0.7 | 3.3 |
| Comparative Example 1 | 0.0 | 0.6 | 3.5 | 5.9 | 3.6 | 4.2 |
| Comparative Example 2 | 2.6 | 20.7 | 81.7 | 5.4 | 42.9 | 85.8 |
| Comparative Example 3 | 0.5 | 5.1 | 30.1 | 2.3 | 10.0 | 46.2 |

TABLE 3-2

| Over-laminate film | $L^*_1$ (before stretching) | $L^*_2$ (after 150% stretching) | ΔL* |
|---|---|---|---|
| Example 1 | 22.00 | 22.98 | 0.98 |
| Comparative Example 1 | 23.81 | 28.01 | 4.20 |
| Comparative Example 2 | 24.65 | 26.20 | 1.55 |
| Comparative Example 3 | 26.19 | 27.45 | 1.26 |

Making of Graphic Laminate

Using the over-laminate film described in Table 5, the graphic laminates of Examples 1GA and 1GB and Comparative Examples 1GA and 1GB to 2GB were made.

Inkjet Printing A

The printed layers of graphic films were formed using two inkjet printers. One is an UV inkjet printer UJF-3042FX (Mimaki Engineering Co., Ltd., Tomi-shi, Nagano, Japan), and the other is a solvent inkjet printer XR-640 (Roland DGCorporation, Hamamatsu-shi, Shizuoka, Japan). The printing conditions are described in Table 4-1 and Table 4-2.

TABLE 4-1

| | |
|---|---|
| Printer | UJF-3042FX (Mimaki Engineering Co., Ltd., Tomi-shi, Nagano, Japan) |
| UV curable type inkjet ink | CMYKW Ink: LUS-200 (Mimaki Engineering Co., Ltd., Tomi-shi, Nagano, Japan) |
| Printing conditions | 720 × 600 dpi, 16 passes, unidirectional printing, high UV level Laydown CMYKW Ink: 100% |
| Ink L/M/S Drop mode | 3/2/1 |
| Number of printed layers | 1 |
| Printed image | CMYK Bar |
| Graphic film | IJ180CV3-10XR |

TABLE 4-2

| | |
|---|---|
| Printer | XR-640 (Roland DG Corporation, Hamamatsu-shi, Shizuoka, Japan) |
| Solvent Inkjet ink | CMYKLcLmLkW: EcoMax 2 (Roland DG Corporation, Hamamatsu-shi, Shizuoka, Japan) |
| Printing Conditions | 720 × 720 dpi, standard, bidirectional printing, laydown 100% |
| Printed layer | 1 |
| Printed image | CMYK Bar |
| Graphic Film | IJ5331CV3 |

TABLE 5

| | Over-laminate film | Graphic film printed layer |
|---|---|---|
| Example 1GA | Over-laminate film 1 | UV inkjet printing |
| Example 1GB | Over-laminate film 1 | Solvent inkjet printing |
| Comparative Example 1GA | IJ4117N | UV inkjet printing |
| Comparative Example 1GB | IJ4117N | Solvent inkjet printing |
| Comparative Example 2GB | IJ4137 | Solvent inkjet printing |

For the graphic laminates of Example 1GA, Example 1GB, Comparative Example 1GA, Comparative Example 1GB, and Comparative Example 2GB, the visible light reflectance, contrast ratio, and the like were measured under the following conditions.

Visible Light Reflectance

For the printed portions (CMYK) and unprinted portion (white) of the graphic laminate, the visible light reflectance was measured in accordance with JIS A 5759:2008 using an ultraviolet visible near-infrared (UV-Vis-NIR) spectrophotometer SolidSpec-3700 (Shimadzu Corporation, Kyoto-shi, Kyoto, Japan).

Contrast Ratio, Contrast Improvement Index and Visible Light Reflection Retention From the visible light reflectance, the contrast ratio, contrast improvement index and visible light reflectance retention were determined according to the following equation. A higher contrast improvement index of greater than 1 means providing a design appearance with sharp visual effects with distinct contrast differences. The contrast improvement index of less than 1 means that the contrast ratio was reduced by covering with the over-laminate film. The visible light reflection retention of more than 100% means that the visible light reflectance was increased by covering by the over-laminate film.

Contrast ratio=(visible light reflectance in printed portions and unprinted portions other than black ($K$))/(visible light reflectance of black printed portions)

Contrast improvement index=(contrast ratio of each printed portion and unprinted portion covered with the over-laminate film)/(contrast ratio of each printed portion and unprinted portion not covered with the over-laminate film)

Visible light reflection retention=(visible light reflectance of printed and unprinted portions covered with the over-laminate film)/(visible light reflectance of printed and unprinted portions not covered with the over-laminate film)

Surface Glossiness

The surface glossiness was measured at the measurement angles of 20 degrees/60 degrees/85 degrees using a portable glossmeter BYK-Gardner micro-TRI-gloss (BYK Japan KK, Shinjuku-ku, Tokyo, Japan). When the surface glossiness at 60 degrees was 5 GU or less, the sample was evaluated as satisfying practical low glossiness requirements. Furthermore, when the surface glossiness of 0.2 GU or less at the measurement angle of 20 degrees, 0.7 GU or less at 60 degrees, and 5.0 GU or less at 85 degrees was satisfied, the sample was evaluated as exhibiting significantly excellent low gloss surface appearance.

The evaluation results for the graphic laminates of Example 1GA and Example 1GB as well as Comparative Examples 1GA and 1GB to 2GB are shown in Table 6A (printed layer: UV curable inkjet printing) and Table 6B (printed layer: solvent inkjet printing). Reference Example 1GA (printed layer: UV curable inkjet printing) and Reference Example 1GB (printed layer: solvent inkjet printing) are the evaluation results of a graphic film having a printed layer that is not covered with an over-laminate film.

TABLE 6A

| | | Visible light reflectance (%) | Contrast Ratio | Contrast improvement index | Visible light reflection retention (%) | Surface glossiness at 60 degrees (GU) |
|---|---|---|---|---|---|---|
| Reference Example 1GA | Cyan 100% | 19.4 | 2.27 | — | — | 4.2 |
| | Magenta 100% | 15.3 | 1.79 | — | — | 4.2 |
| | Yellow 100% | 70.5 | 8.23 | — | — | 7.9 |

TABLE 6A-continued

|  |  | Visible light reflectance (%) | Contrast Ratio | Contrast improvement index | Visible light reflection retention (%) | Surface glossiness at 60 degrees (GU) |
| --- | --- | --- | --- | --- | --- | --- |
|  | Black 100% | 8.6 | 1.00 | — | — | 5.1 |
|  | Unprinted portion | 88.0 | 10.29 | — | — | 92.2 |
| Example 1GA | Cyan 100% | 17.9 | 3.53 | 1.56 | 92 | 1.0 |
|  | Magenta 100% | 14.1 | 2.77 | 1.55 | 92 | 1.0 |
|  | Yellow 100% | 69.3 | 13.64 | 1.66 | 98 | 2.0 |
|  | Black 100% | 5.1 | 1.00 | — | 59 | 0.6 |
|  | Unprinted portion | 87.0 | 17.14 | 1.67 | 99 | 2.2 |
| Comparative Example 1GA | Cyan 100% | 18.9 | 1.67 | 0.74 | 97 | 22.2 |
|  | Magenta 100% | 13.9 | 1.23 | 0.69 | 91 | 22.4 |
|  | Yellow 100% | 72.1 | 6.39 | 0.78 | 102 | 23.5 |
|  | Black 100% | 11.3 | 1.00 | — | 132 | 21.7 |
|  | Unprinted portion | 87.0 | 7.71 | 0.75 | 99 | 23.9 |

TABLE 6B

|  |  | Visible light reflectance (%) | Contrast ratio | Contrast improvement index | Visible light reflection retention (%) | Surface glossiness at 60 degrees (GU) |
| --- | --- | --- | --- | --- | --- | --- |
| Reference Example 1GB | Cyan 100% | 18.3 | 2.78 | — | — | 76.2 |
|  | Magenta 100% | 19.2 | 2.91 | — | — | 87.2 |
|  | Yellow 100% | 83.8 | 12.70 | — | — | 106.0 |
|  | Black 100% | 6.6 | 1.00 | — | — | 93.7 |
|  | Unprinted portion | 92.7 | 14.03 | — | — | 80.7 |
| Example 1GB | Cyan 100% | 19.7 | 5.33 | 1.92 | 108 | 0.7 |
|  | Magenta 100% | 18.7 | 5.05 | 1.74 | 97 | 0.7 |
|  | Yellow 100% | 83.1 | 22.45 | 1.77 | 99 | 2.1 |
|  | Black 100% | 3.7 | 1.00 | — | 56 | 0.4 |
|  | Unprinted portion | 91.2 | 24.63 | 1.76 | 98 | 2.2 |
| Comparative Example 1GB | Cyan 100% | 17.8 | 3.87 | 1.39 | 97 | 19.1 |
|  | Magenta 100% | 18.0 | 3.91 | 1.35 | 94 | 19.3 |
|  | Yellow 100% | 82.5 | 17.90 | 1.41 | 98 | 21.9 |
|  | Black 100% | 4.6 | 1.00 | — | 70 | 19.1 |
|  | Unprinted portion | 91.2 | 19.78 | 1.41 | 98 | 21.0 |

TABLE 6B-continued

|  |  | Visible light reflectance (%) | Contrast ratio | Contrast improvement index | Visible light reflection retention (%) | Surface glossiness at 60 degrees (GU) |
|---|---|---|---|---|---|---|
| Comparative Example 2GB | Cyan 100% | 18.2 | 3.41 | 1.23 | 99 | 5.2 |
|  | Magenta 100% | 18.3 | 3.43 | 1.18 | 96 | 5.2 |
|  | Yellow 100% | 80.7 | 15.09 | 1.19 | 96 | 7.1 |
|  | Black 100% | 5.3 | 1.00 | — | 81 | 5.2 |
|  | Unprinted portion | 89.2 | 16.68 | 1.19 | 96 | 7.0 |

The solvent inkjet printed layer itself forms a very smooth surface, and therefore the difference in visible light reflectance of the portions covered with the over-laminate film used in Comparative Examples 1GB to 2GB and the portion uncovered is small. On the other hand, when the over-laminate film 1 of Example 1 is used, the visible light reflection retention of the black printed portion is greatly reduced, so that a design appearance with a high contrast improvement index, or an improved contrast ratio can be provided.

Inkjet Printing B

Reference Example 2G

The graphic film of Reference Example 2G was made by printing directly on the graphic film SC501 under the conditions described in Table 7.

TABLE 7

| Printer | UJF-3042FX (Mimaki Engineering Co., Ltd., Tomi-shi, Nagano, Japan) |
|---|---|
| UV curable inkjet ink | CMYKW Ink: LUS-200 (Mimaki Engineering Co., Ltd., Tomi-shi, Nagano, Japan) Transparent ink: LH-100 clear (Mimaki Engineering Co., Ltd., Tomi-shi, Nagano, Japan) |
| Printing conditions | 720 × 600 dpi, 16 passes, unidirectional printing, UV level high Laydown CMYK ink: 100%, transparent ink: 20%, 50%, 70%, 100% |
| Ink L/M/S Drop mode | 3/2/1 |

TABLE 7-continued

| Number of printed layers | 1 |
|---|---|
| Printed image | Woodgrain texture pattern (expressed woodgrain in 0 to 100% gray scale) CMYK bars (laydown: 100% for each color) Transparent ink bar (laydown: 100%, 70%, 50%, 20% on gray scale) |
| Remarks | The woodgrain texture pattern and the transparent ink bar were printed with the transparent ink. |

Example 2G and Comparative Example 3G

The low gloss layer or matte surface of the over-laminate film described in Table 8 was subjected to printing under the conditions listed in Table 7, and then laminated onto the graphic film SC501 to prepare the graphic laminates of Example 2G and Comparative Example 3G.

TABLE 8

|  | Over-laminate film |
|---|---|
| Example 2G | Over-laminate film 1 |
| Comparative Example 3G | IJ4137 |

Evaluation results for CMYK bars, transparent ink bars, and unprinted portions of the graphic laminates of Example 2G and Comparative Example 3G are shown in Table 9. Reference Example 2G in Table 9 is the evaluation result of the directly printed graphic film SC501 that is not covered with the over-laminate film.

TABLE 9

|  |  | Visible light reflectance (%) | Contrast ratio | Contrast improvement index | Visible light reflection retention (%) | Surface glossiness at 60 degrees (GU) |
|---|---|---|---|---|---|---|
| Reference Example 2G | Cyan 100% | 4.1 | 0.90 | — | — | 4.4 |
|  | Magenta 100% | 6.1 | 1.32 | — | — | 4.7 |
|  | Yellow 100% | 6.4 | 1.38 | — | — | 7.2 |
|  | Black 100% | 5.6 | 1.22 | — | — | 4.5 |
|  | Transparent 100% | 4.5 | 0.99 | — | — | 8.3 |
|  | Transparent 70% | 4.6 | 1.01 | — | — | 16.5 |
|  | Transparent 50% | 4.8 | 1.05 | — | — | 8.3 |
|  | Transparent 20% | 4.7 | 1.03 | — | — | 38.4 |

TABLE 9-continued

|  |  | Visible light reflectance (%) | Contrast ratio | Contrast improvement index | Visible light reflection retention (%) | Surface glossiness at 60 degrees (GU) |
|---|---|---|---|---|---|---|
|  | Unprinted portion | 4.6 | 1.00 | — | — | 79.9 |
| Example 2G | Cyan 100% | 4.1 | 1.38 | 1.53 | 99 | 4.8 |
|  | Magenta 100% | 6.0 | 2.01 | 1.52 | 99 | 4.2 |
|  | Yellow 100% | 5.9 | 1.97 | 1.43 | 93 | 1.9 |
|  | Black 100% | 5.8 | 1.93 | 1.58 | 102 | 3.4 |
|  | Transparent 100% | 4.6 | 1.54 | 1.56 | 101 | 3.4 |
|  | Transparent 70% | 4.5 | 1.49 | 1.48 | 96 | 1.5 |
|  | Transparent 50% | 4.2 | 1.41 | 1.34 | 87 | 0.9 |
|  | Transparent 20% | 3.6 | 1.21 | 1.17 | 76 | 0.4 |
|  | Unprinted portion | 3.0 | 1.00 | — | 65 | 0.3 |
| Comparative Example 3G | Cyan 100% | 4.1 | 0.96 | 1.06 | 99 | 4.6 |
|  | Magenta 100% | 6.1 | 1.44 | 1.09 | 101 | 4.8 |
|  | Yellow 100% | 6.5 | 1.52 | 1.10 | 102 | 6.0 |
|  | Black 100% | 5.6 | 1.31 | 1.07 | 100 | 4.3 |
|  | Transparent 100% | 4.8 | 1.11 | 1.13 | 105 | 8.5 |
|  | Transparent 70% | 4.6 | 1.08 | 1.07 | 99 | 7.6 |
|  | Transparent 50% | 4.6 | 1.08 | 1.03 | 95 | 8.3 |
|  | Transparent 20% | 4.5 | 1.04 | 1.02 | 94 | 10.1 |
|  | Unprinted portion | 4.3 | 1.00 | — | 93 | 14.5 |

When the over-laminate film (IJ4137) of Comparative Example 3G is used, it is difficult to effectively decrease the visible light reflection retention by the laydown of the ink. On the other hand, when the over-laminate film of Example 2G is used, the visible light reflection retention can be adjusted by laydown of the ink. Specifically, the visible light reflectance retention of Example 2G is 101% when transparent 100%, gradually decreases as the decrease of the laydown, and is 65% in the unprinted portions. This means that the formation of a printed pattern on the over-laminate film by adjusting the laydown of the ink allows the formation of a visible texture that provides various visual effects on the low gloss surface.

It is obvious to those skilled in the art that various modifications and variations of the present invention are possible without departing from the scope and spirit of the present invention.

The invention claimed is:

1. An over-laminate film applied to a decorative surface, the over-laminate film comprising:
   a transparent resin base film having a first surface and a second surface opposite to the first surface;
   a low gloss layer disposed on the first surface of the transparent resin base film, wherein the low gloss layer comprises resin beads in an amount of 100 parts by mass or more and 240 parts by mass or less per 100 parts by mass of the binder, wherein the low gloss layer has a surface glossiness of 5 GU or less at 60 degrees, the low gloss layer comprising:
   a binder containing a resin,
   resin beads having an average particle size of 4 μm or greater and 20 μm or less, and
   nanosilica particles; and
   a transparent adhesive layer disposed on the second surface of the transparent resin base film.

2. The over-laminate film according to claim 1, further comprising a printed pattern that partially covers the low gloss layer.

3. The over-laminate film according to claim 2, wherein the printed pattern is an inkjet printed pattern.

4. The over-laminate film according to claim 1, wherein the over-laminate film is stretchable.

5. The over-laminate film according to claim 1, wherein the nanosilica particles have an average particle size of 10 nm or greater and 100 nm or less.

6. The over-laminate film according to claim 1, wherein the low glass layer comprises the nanosilica particles in an amount of 5 parts by mass or greater and 120 parts by mass or less per 100 parts by mass of the binder.

7. The over-laminate film according to claim 1, wherein the binder comprises a urethane resin.

8. The over-laminate film according to claim 1, wherein the resin beads are urethane resin beads.

9. The over-laminate film according to claim 1, wherein the surface glossiness of the low gloss layer is 0.7 GU or less at 60 degrees.

10. The over-laminate film according to claim 1, wherein the binder further comprises a cellulose ester.

11. The over-laminate film according to claim 7, wherein the urethane resin comprises a cured product of a two-part urethane resin composition.

12. The over-laminate film according to claim 1, wherein the transparent resin base film comprises at least one type of resin selected from the group consisting of polyvinyl chloride, polyurethane, polyethylene, polypropylene, vinyl chloride-vinyl acetate resins, acrylic resins, cellulose resins, and fluororesins.

13. A graphic laminate comprising:
a graphic film comprising a resin base film having a first surface and a second surface opposite to the first surface, a printed layer disposed on the first surface, and an adhesive layer disposed on the second surface; and
the over-laminate film described in claim 1 that covers the printed layer of the graphic film.

14. The graphic laminate according to claim 13, wherein the printed layer of the graphic film comprises a printed region and an unprinted region.

\* \* \* \* \*